United States Patent
Yao

(10) Patent No.: US 7,498,422 B2
(45) Date of Patent: Mar. 3, 2009

(54) LIGNOPHENOL DERIVATIVE, POLYMER, RESIN COMPOSITION, AND MOLDED RESIN

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/797,331

(22) Filed: May 2, 2007

(65) Prior Publication Data

US 2008/0125544 A1 May 29, 2008

(30) Foreign Application Priority Data

Nov. 28, 2006 (JP) ............................. 2006-320543

(51) Int. Cl.
- C07G 1/00 (2006.01)
- C08L 97/00 (2006.01)
- C08G 63/48 (2006.01)
- C08G 63/91 (2006.01)
- C09D 11/10 (2006.01)

(52) U.S. Cl. ..................... 530/502; 530/501; 525/54.4

(58) Field of Classification Search ................ 525/54.1; 530/501, 502

See application file for complete search history.

(56) References Cited

U.S. PATENT DOCUMENTS 2,319,952 A * 5/1943 Schorger .................... 527/303

(Continued)

FOREIGN PATENT DOCUMENTS

EP        1 022 283 A1    7/2000

(Continued)

OTHER PUBLICATIONS

Ohmae et al. (Transactions of the Materials Research Society of Japan, 26(3) 829-832, 2001).*

*Primary Examiner*—Mark Eashoo
*Assistant Examiner*—Liam J Heincer
(74) *Attorney, Agent, or Firm*—Oliff & Berridge, PLC

(57) ABSTRACT

A lignophenol derivative is represented by Formula (1):

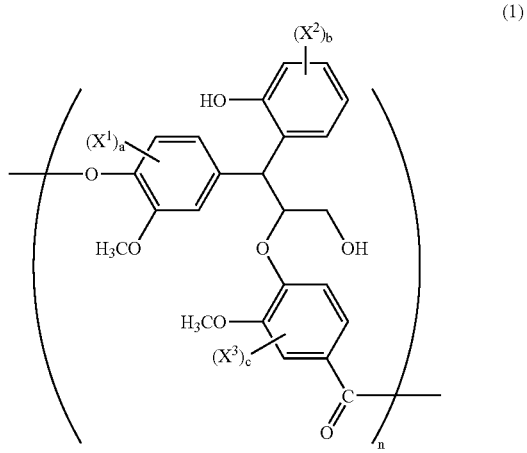

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group; a and c each independently is an integer of 0 to 3; b is an integer of 0 to 4; and n is an integer of 1 to 10000.

10 Claims, 2 Drawing Sheets

U.S. PATENT DOCUMENTS

| | | | | |
|---|---|---|---|---|
| 2,394,000 A * | 2/1946 | McElhinnery | ............... | 524/732 |
| 3,355,400 A * | 11/1967 | Smith et al. | ..................... | 524/72 |
| 3,471,420 A * | 10/1969 | Campbell | ..................... | 524/21 |
| 3,519,581 A * | 7/1970 | Dougherty et al. | .......... | 527/401 |
| 3,600,308 A * | 8/1971 | Allan | ......................... | 210/728 |
| 3,671,428 A * | 6/1972 | Kim | ........................... | 507/106 |
| 3,763,139 A * | 10/1973 | Falkehag | ..................... | 530/504 |
| 3,984,363 A * | 10/1976 | D'Alelio | ..................... | 526/270 |
| 4,249,606 A * | 2/1981 | Kalfoglou | ................ | 166/270.1 |
| 4,344,487 A * | 8/1982 | Kalfoglou | ................ | 166/270.1 |
| 5,066,790 A * | 11/1991 | Glasser et al. | .............. | 530/502 |
| 5,373,070 A * | 12/1994 | Gardziella et al. | ........... | 525/480 |
| 5,382,608 A * | 1/1995 | Gardzielia et al. | ............ | 524/14 |
| 5,608,040 A * | 3/1997 | Huettermann et al. | ....... | 530/500 |
| 5,647,956 A * | 7/1997 | Elliott et al. | ................. | 162/163 |
| 6,045,606 A * | 4/2000 | Matzinger | ................ | 106/31.27 |
| 6,114,471 A * | 9/2000 | Owens et al. | ............... | 525/420 |
| 6,284,838 B1 * | 9/2001 | Silbiger | ..................... | 525/54.4 |
| 6,632,931 B1 * | 10/2003 | Funaoka | ..................... | 530/502 |
| 2002/0192774 A1 * | 12/2002 | Ahring et al. | ............... | 435/162 |
| 2006/0035392 A1 * | 2/2006 | Funaoka et al. | ................ | 438/12 |
| 2006/0169430 A1 * | 8/2006 | Tarasenko | ..................... | 162/81 |
| 2006/0260773 A1 * | 11/2006 | Tan et al. | ...................... | 162/70 |
| 2007/0278463 A1 * | 12/2007 | Ratzsch et al. | .............. | 252/607 |
| 2008/0017832 A1 * | 1/2008 | Funaoka et al. | ............. | 252/500 |
| 2008/0048365 A1 * | 2/2008 | Yao | ....................... | 264/328.17 |
| 2008/0051507 A1 * | 2/2008 | Yao | ............................ | 524/599 |

FOREIGN PATENT DOCUMENTS

| | | |
|---|---|---|
| EP | 1 273 632 A1 | 9/2003 |
| EP | 1 603 185 A1 | 12/2005 |
| JP | A-2003-268222 | 9/2003 |
| JP | A-2003-313401 | 11/2003 |
| WO | WO 2004070868 A1 * | 8/2004 |

\* cited by examiner

LIGNOPHENOL DERIVATIVE, POLYMER, RESIN COMPOSITION, AND MOLDED RESIN

CROSS-REFERENCE TO RELATED APPLICATIONS

This application is based on and claims priority under 35 USC 119 from Japanese Patent Application No. 2006-320543 filed on Nov. 28, 2006.

BACKGROUND

1. Technical Field

The present invention relates to a lignophenol derivative, a polymer, a resin composition, and a molded resin.

2. Related Art

Recently, from a viewpoint of conservation of nature, a biodegradable polyester resin has been attracted as a biomass material. A representative example of the biodegradable polyester resin includes polylactic acid.

SUMMARY

According to an aspect of the invention, there is provided a lignophenol derivative represented by Formula (1):

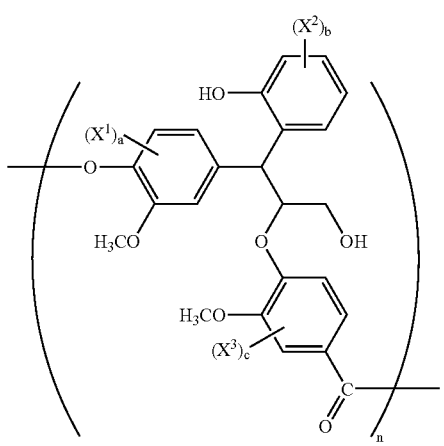

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group; a and c each independently is an integer of 0 to 3; b is an integer of 0 to 4; and n is an integer of 1 to 10000.

BRIEF DESCRIPTION OF THE DRAWINGS

Exemplary embodiment(s) of the present invention will be described in detail based on the following figures, wherein.

DETAILED DESCRIPTION

Figure 1:
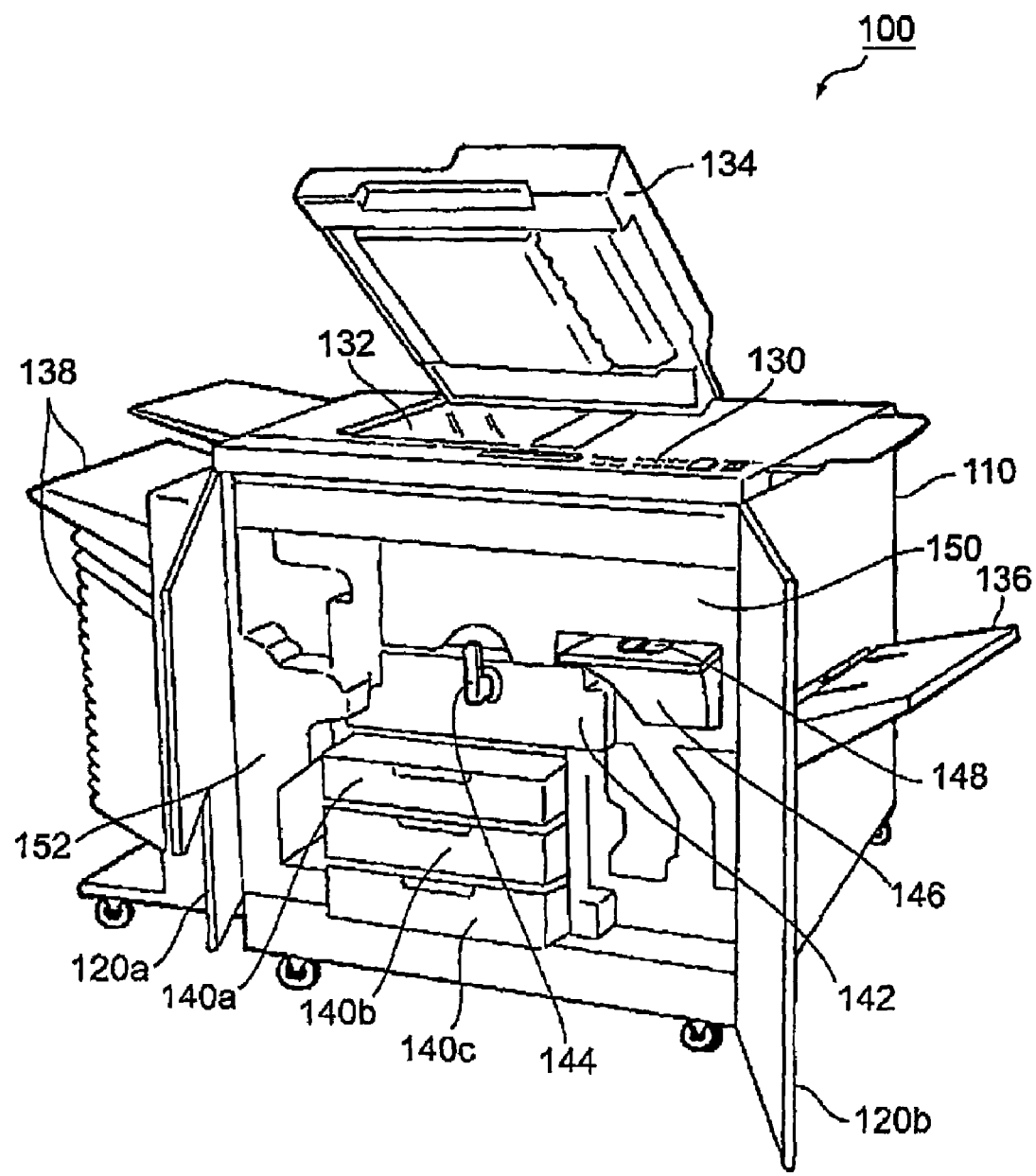
FIG. 1 is an exterior perspective view illustrating an image-forming device having a chassis and office machine components according to one exemplary embodiment of a molded resin of the invention, wherein 100 denotes Image-forming Device, 110 denotes Main Body, 120a and 120b denote Front Covers, 130 denotes Operation Panel, 132 denotes Copy Glass, 134 denotes Automatic Document-Feeding Device, 136 denotes Sheet Tray, 140a to 140c denote Sheet-Storing Cassette, 142 denotes Process Cartridge, 144 denotes Operation Lever, 146 denotes Toner-Storing Unit, 148 denotes Toner-Supplying Port, and 150 and 152 denote Chassis.

Hereinafter, an exemplary embodiment of the present invention will be described in detail with reference to the drawings if necessary.

(Lignophenol Derivative and Polymer)

A lignophenol derivative according to the exemplary embodiment is represented by Formula (1):

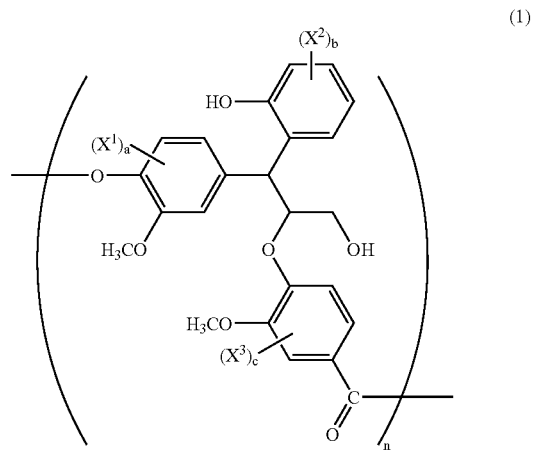

wherein $X^1$, $X^2$, and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group. Examples of a substituent group when $X^1$, $X^2$, and $X^3$ are each independently the substituted alkyl group, the substituted alkoxy group, the substituted aryl group, or the substituted arylene group include the hydroxyl group, the carboxylic acid group, a carboxylic acid derivative group, the alkyl group, and the alkoxy group.

In addition, in Formula (1), a and c each independently is an integer of 0 to 3, b is an integer of 0 to 4, and n is an integer of 1 to 10000.

A preferred example of the lignophenol derivative represented by Formula (1) includes the lignophenol derivative represented by Formulas 2 to 4:

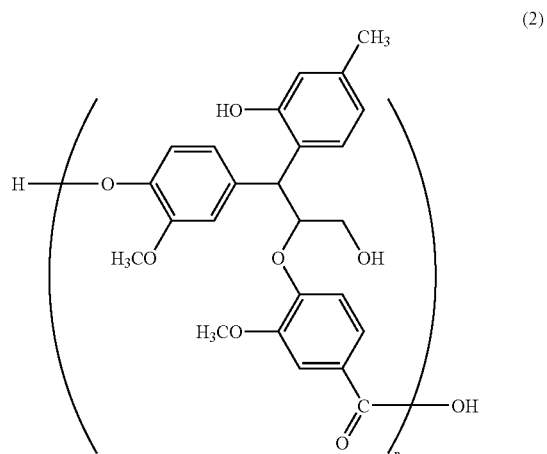

wherein n is an integer of 1 to 10000,

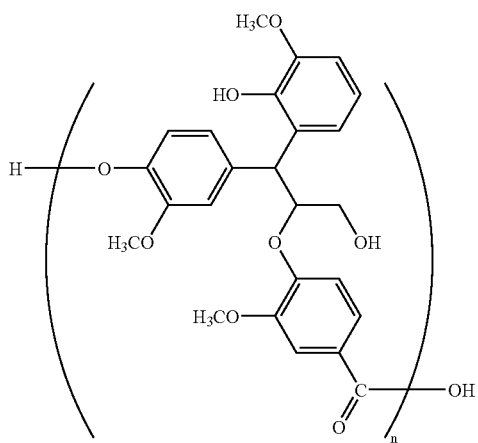

(3)

wherein n is an integer of 1 to 10000, and

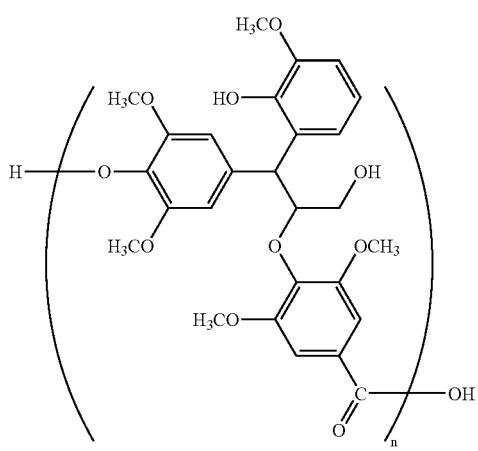

(4)

wherein n is an integer of 1 to 10000.

The lignophenol derivative represented by Formula (1) may be a single kind of polymer or a mixture of two kinds or more of polymers having a different structure. When the lignophenol derivative represented by Formula (1) is a polymer mixture, n in Formula (1) means an average value of n with respect to a total amount of the polymer mixture.

When the lignophenol derivative represented by Formula (1) is the polymer, its weight-averaged molecular weight is preferably in the range of 5000 to 500000, and more preferably in the range of 8000 to 200000, in terms of polystyrene, from a viewpoint of achieving both mechanical strength and formability. In addition, from a viewpoint of achieving further preferable formability, the weight-averaged molecular weight of the polymer is preferably in the range of 3000 to 6000 in terms of polystyrene. The weight-averaged molecular weight is measured, for example, by a gel permeation chromatography (GPC). For the present invention, the weight-averaged molecular weight is measured under conditions described below by using the gel permeation chromatography (GPC: HLC-8120 GPC SC-8020 manufactured by TOSOH CORPORATION). A solvent (tetrahydrofuran) is poured at a flow rate of 1.2 ml/min at 40° C., a tetrahydrofuran sample solution having a concentration of 0.2 g/20 ml is injected as a sample weight of 3 mg, and the measurement is carried out by using IR detector. For the measurement of the weight-averaged molecular weight of the sample, selected is a measurement condition that the molecular weight of the sample is within the range that a logarithm of the molecular weight and a count number on a calibration curve prepared by various kinds of a mono-dispersed polystyrene standard sample are linear. The reliability of the measurement result can be confirmed by a NBS706 polystyrene standard sample prepared by the aforementioned measurement conditions having the weight-averaged molecular weight of $Mw=28.8 \times 10^4$. As a column of the GPC, TSK-GEL and GMH (manufactured by TOSOH Corporation) satisfying the aforementioned conditions are used. In Formula described above, n is calculated by dividing the weight-averaged molecular weight thus measured by the molecular weight of a repeating unit.

As a method for preparing the lignophenol derivative represented by Formula (1), for example, there may be used a method in which lignin contained in plant resources is separated therefrom to be converted into the lignophenol derivative and then extracted, and the terminal thereof is carboxylated by an hydroxylation reaction by adding water and an oxidation reaction by using natural ketone. A configuration of the lignophenol derivative thus obtained may differ depending on the plant resources such as needing-leaf trees and broad-leaf trees, but it does not cause a problem in characteristic.

A modification of the lignophenol derivative which can be obtained by the preparation method described above, that is, an introduction of a substituent represented by $X^1$, $X^2$, and $X^3$ in Formula (1) can be made by reacting a compound having an activated hydroxyl group corresponding to $X^1$, $X^2$, and $X^3$ to C—H portion having high activity in a benzene ring among the lignophenol derivative and combining them by an autocatalytic reaction. The lignophenol derivative which is modified by a desired functional group can be obtained by reacting aliphatic alcohol when modifying alkyl group and reacting phenols to aryl group and benzyl alcohols to arylene group when modifying alkoxy group. The reaction may be carried by a stirring reaction in a solvent such as methylethylketone and acetone under the temperature condition of the room temperature to 150° C.

The polymer according to the exemplary embodiment has a structural unit represented by Formula (5).

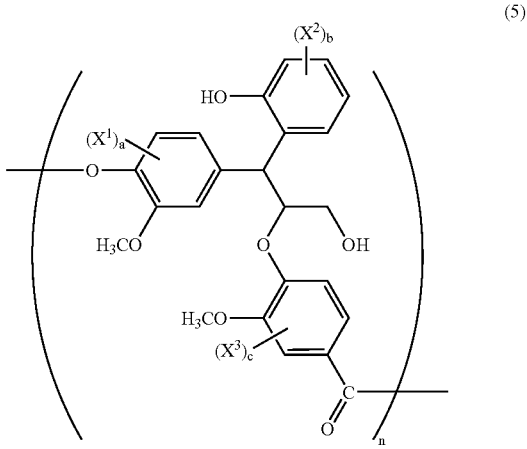

(5)

Since $X^1$, $X^2$, $X^3$, a, b, c, and n in Formula (5) are same as the $X^1$, $X^2$, $X^3$, a, b, c, and n in Formula (1), the repeated description will be omitted herein.

Examples of the polymer in case where the polymer according to the exemplary embodiment is a homopolymer consisting of the structural unit represented by Formula (5) include the lignophenol derivative represented by Formula (1), and a preferred example thereof includes the lignophenol derivatives represented by Formulas 2 to 4.

In case where the polymer according to the exemplary embodiment has the structural unit represented by Formula (5) and another structural unit, examples of other structural units include a polyester structure such as an aliphatic polyester structure, a polycarbonate structure, an aromatic polyester structure, a polyamide structure, a polyolefin structure such as polypropylene and polyethylene, a polystyrene structure, a polyacrylate structure, a poly butadiene structure, or a copolymer structure thereof. Among these, the aliphatic polyester structure is preferred. In this case, the copolymer may be any one of a block copolymer or random copolymer. In addition, the weight-averaged molecular weight of the polymer may be suitably selected depending on a combination of the structural unit represented by Formula (5) and the other structural unit.

In the polymer according to the exemplary embodiment, the ratio of the structural unit represented by Formula (5) to the total structural unit is preferably in the range of 5 mol % to 100 mol %, and more preferably 10 mole to 100 mol %. When the ratio of the structural unit represented by Formula (5) is below 5 mol %, the flame retardancy, mechanical strength, and heat resistance tend to be deteriorated.

(Resin Composition)

The resin composition according to the present exemplary embodiment includes the lignophenol derivative represented by Formula (1) or the polymer having the structural unit represented by Formula (5).

The resin composition according to the exemplary embodiment may include the lignophenol derivative represented by Formula (1) or the polymer having the structural unit represented by Formula (5) alone, or may further include other resins or additives. In the resin composition according to the exemplary embodiment, a sum of the content of the lignophenol derivative represented by Formula (1) and the polymer is preferably in the range of 5 mass % to 100 mass %, and more preferably 10 mass % to 100 mass %, based on the total content of the resin composition. When the sum of the content is below 5 mass %, the flame retardancy, mechanical strength, and heat resistance tend to be deteriorated.

In the resin composition according to the exemplary embodiment, examples of a resin which can be used in combination with the lignophenol derivative represented by Formula (1) or the polymer having the structural unit represented by Formula (5) include polyester such as the aliphatic polyester, and the polycarbonate. Among these, the aliphatic polyester is preferred. It is assumed that excellent heat resistance and mechanical strength can be exhibited when the aliphatic polyester is used in addition to the lignophenol derivative represented by Formula (1) or the polymer having the structural unit represented by Formula (5), because a phenol activity of the lignophenol derivative represented by Formula (1) or the polymer having the structural unit represented by Formula (5), and an activity of the terminal reactive group react to an unreacted terminal of the aliphatic polyester at a temperature range of a kneading process, an injection molding process or the like so that a partial cross linking or expansion of a molecular chain is generated.

Specifically, examples of the aliphatic polyester include polylactic acid, polyhydroxy butyric acid, polybutyrene succinate, and polybutylene adipate. Among these, because of its large potential amount as a plant derived material, the polylactic acid and the polyhydroxy butyric acid are preferred, and the polylactic acid is particularly preferred.

When the resin composition according to the exemplary embodiment contains the aliphatic polyester, the content of the aliphatic polyester is preferably in the range of 5 mass % to 80 mass %, and more preferably 10 mass % to 50 mass %, based on the total content of the resin composition. When the content of the aliphatic polyester is below 5 mass %, its flexibility tends to be deteriorated, and the resin composition thereof may not be used for a special application or may be broken by a solvent. When the content exceeds 80 mass %, its mechanical strength tends to be deteriorated and it may not be used for an application requiring high mechanical strength.

Since the resin composition according to the exemplary embodiment contains the lignophenol derivative represented by Formula (1) or the polymer having the structural unit represented by Formula (5), the resin composition exhibits excellent flame retardancy. The resin composition may further include a flame retardant other than such the components.

Examples of the flame retardant include brome-based flame retardants, phosphorus-based flame retardants, silicon-based flame retardants, and inorganic particle-based flame retardants. Among these, the brome-based flame retardants exhibit excellent flame retardancy, but those may generate poisonous gas at the time of combustion. Therefore, from a viewpoint of reduction in an environmental load, the phosphorus-based flame retardants, silicon-based flame retardants, and inorganic particle-based flame retardants are preferred.

Preferred examples of the flame retardant include the phosphorus-based flame retardants such as phosphorus ester-based, condensed phosphorus ester-based, and phosphorus-polymerized polyester-based, the silicon-based flame retardants such as silicon powder and silicon resin, and the inorganic particle-based flame retardants such as aluminium hydroxide and magnesium hydroxide.

A content of the flame retardant is preferably in the range of 1 mass % to 30 mass %, and more preferably 3 mass % to 25 mass %, based on the total content of the resin composition.

Other additives besides the flame retardant, for example, include an antioxidant, a reinforcing agent, a compatibilizing agent, a weathering agent, an anti-hydrolysis agent, and a catalyst. A content of these additives is preferably 5 mass % or less based on the total content of the resin composition.

(Molded Resin)

A molded resin according to the present exemplary embodiment includes the lignophenol derivative represented by Formula (1) or the polymer having the structural unit represented by Formula (5), and preferably further includes the aliphatic polyester. Such the molded resin can be obtained by molding the resin composition according to the exemplary embodiment.

A method for producing the molded resin according to the exemplary embodiment is not particularly limited and examples of the method include an injection molding, an injection-compression molding, an extrusion molding, a blow molding, a calender molding, a coating, a cast, and a dip coating. Among these, the injection molding having an effect for accelerating crystallization of the molded body is most preferably used in the exemplary embodiment.

In the method for producing the molded resin according to the exemplary embodiment, it is preferable that the resin composition is sufficiently blended before molding the resin composition. For example, the resin composition may be blended in a method for blending components of the resin composition such as the lignophenol derivative represented by Formula (1) or the polymer having the structural unit represented by Formula (5), and the aliphatic polyester by a mechanical process such as a kneading process, a method for blending the components by dissolving in an organic solvent, a method for dissolving and blending each components in the organic solvent or water and subjecting them into the surface reaction, or a method for emulsifying the components such to be blended. Among these, in case where the resin composition according to the exemplary embodiment which contains the aliphatic polyester and metal oxides or alkali metal oxides are added to the resin composition in a two-axial kneading process at a temperature in the range of from 100° C. or more to less than 200° C., the functional group of the aliphatic polyester reacts to the functional group of the lignophenol derivative represented by Formula (1) or the polymer represented by Formula (5) so that quasi interpenetrating polymer networks (IPN) are generated, the heat resistance and impact resistance are improved, and acid resistance is improved due to the reaction of hydroxyl group of the lignophenol. Thus, it is particularly preferred. Since high compatibility is exhibited at the molding temperature (180 to 200° C.) of the lignophenol derivative represented by Formula (1) or the polymer represented by Formula (5), and the aliphatic polyester compound, those materials can be individually introduced in a molding machine and molded in one step while kneading them in the injection molding machine. In addition, the lignophenol derivative represented by Formula (1) or the polymer represented by Formula (5), and the aliphatic polyester compound form a molded body having excessively high impact-resistant strength by a reactive processing action which generates a chemical reaction in the molding machine and such a chemical reaction is reversibly repeated. Therefore, even when a pulverization process and a re-injection molding process are repeated, the impact-resistant strength does not decrease and particularly excellent recycling property is exhibited.

In case where the molded resin according to the exemplary embodiment is produced by the injection molding process, the resin composition according to the exemplary embodiment or the components thereof may be added to the injection molding machine as a pellet shaped compound. However, from a viewpoint of productivity and manufacturing cost, it is preferable that the lignophenol derivative represented by Formula (1) or the polymer represented by Formula (5), the aliphatic polyester compound, and the additives such as the flame retardant which can be added as needed are kneaded and then the resultant is subjected to the injection molding. Even when the compound process is not carried out as described above, by using both the lignophenol compound and the aliphatic polyester compound, the molded resin, which has excellent flame retardancy, acid resistance, weathering property, and recycling property, in addition to sufficiently high level of plant contents, mechanical strength, and heat resistance, can be certainly produced.

In case of the injection molding, a preferred molding condition is that, for example, the injection temperature is in the range of 160 to 250° C., mold temperature is in the range of 20 to 140° C., and cooling time is in the range of 10 to 120 seconds.

The molded resin thus obtained according to the exemplary embodiment can be used in a wide range of applications. Examples of the applications of the molded resin of the invention include, specifically, electric—electronic components or its chassis, vehicle components, dry material such as a wall paper or exterior materials, tableware, sheets, a buffering agent, and fibers. Among these, the molded resin is suitably used for office equipment components and chassis requiring high impact-resistant strength and flame retardancy, and excellent anti-hydrolysis property, used in various fields, and having high level of low environment load effect. Here, the chassis is a chassis of the electronic home appliances, cases, office equipments, or the like. Particularly, the chassis of the off ice equipments requires excellent weathering property, and thus it can be suitably used.

In case where the chassis is formed by using the molded resin according to the exemplary invention, entire part of the chassis may be formed of the molded resin according to the exemplary embodiment. However, in case where a part requiring a function such as surface impact strength is formed of the molded resin according to the exemplary embodiment, the other parts may be formed of a molded resin different from the molded resin of the present exemplary embodiment. Specifically, it is preferable that a front cover, a rear cover, a sheet feeding tray, a sheet delivering tray, and a platen which are positioned on exterior of a printer, a copying machine, fax, or the like is formed of the molded resin according to the present exemplary embodiment. However, an interior cover, a toner cartridge, a process cartridge, or the like may be formed of any one of a molded resin according to the present exemplary embodiment or a molded resin other than the present exemplary embodiment.

FIG. 1 is an exterior perspective view as viewed from a front side of the image-forming device, that shows an example of an image-forming device having the chassis and the office machine components formed of the molded resin according to the present exemplary embodiment. The image-forming device 100 shown in FIG. 1 includes front covers 120a and 120b on a front surface of a main body 110. Such front covers 120a and 120b can be opened and closed to allow a user to access into the device. Accordingly, the user can replace a used up toner, replace a used up process cartridge, or remove a sheet when the sheet is stuck inside the device. In FIG. 1, there is described the device in which the front covers 120a and 120b are being opened.

On an upper surface of the main body 110, there are provided an operation panel 130, to which various conditions relating to the image formation such as size of the sheet or the number of the sheets are inputted by an operation performed by the user, and a copy glass 132, on which a document to be read is disposed. The main body 110 includes an automatic document-feeding device 134 which can automatically feed the document onto top of the device, that is, the copy glass 132. In addition, the main body 110 includes an image reading device which scans the document image disposed on the copy glass 132 to obtain image data indicating the document image. The image data thus obtained by the image reading device is transmitted to an image-forming unit through a control unit. The image reading device and the control unit are stored inside the chassis 150 constituting a part of the main body 110. The image-forming unit is formed on the chassis 150 as a detachable process cartridge 142. The detachment of the process cartridge 142 becomes possible by rotating an operation lever 144.

On the chassis 150 of the main body 110, a toner-storing unit 146 is mounted so as to supply the toner from a toner-supplying port 148. The toner stored in a toner-storing unit 146 is supplied to a development device.

On a lower portion of the main body 110, sheet-storing cassettes 140a, 140b, and 140c are formed. In addition, in the main body 110, a plurality of conveying rollers constituted by one pair of rollers is arranged inside the device so that a conveying path conveys the sheet of the sheet-storing cassette to the image-forming unit formed on the top portion. The sheet of the sheet-storing cassette is ejected one by one by a sheet ejecting mechanism positioned in the vicinity of the end portion of the conveying path and then delivered to the conveying path. On the side surface of the main body 110, a passive sheet tray 136 is formed so that a sheet can be supplied therefrom.

The sheets on which the image is formed by the image-forming unit are sequentially delivered between two fixed rolls, which are supported by the chassis 152 constituting a part of the main body 110 and abut against each other, and then supplied to the outside of the main body 110. In the main body 110, a plurality of discharging trays 138 is formed on a side opposite to the sheet tray 136 and the sheet after being subjected to the image-forming process is discharged to the trays.

In the image-forming device 100, the front covers 120a and 120b get a lot of loads such as stress or impact generated at the time of opening and closing, vibration generated at the time of forming an image, and heat generated in the image forming device. In addition, the process cartridge 142 gets a lot of loads such as the impact caused by the detachment, the vibration generated at the time of forming an image, and heat generated in the image-forming device. Furthermore, the chassis 150 and the chassis 152 get a lot of loads such as the vibration generated at the time of forming an image and heat generated in the image-forming device. Therefore, the molded resin according to the exemplary embodiment is suitably used as the front covers 120a and 120b of the image-forming device 100, an exterior material of the process cartridge 142, chassis 150, and chassis 152.

EXAMPLES

Hereinafter, the present invention will be described in detail with reference to examples and comparative examples, but the invention is not limited to the examples described below.

Example 1

(Synthesis of Lignophenol Derivative A)

Small fragments obtained at the time of lumbering *Chamaecyparis obtusa* are screened by using a screen having 20 mesh, 10 parts by mass of the chips thus screened are immersed in acetone for 20 hours and then vacuum dried at 80° C. for a hours, and the fat is removed. To the chips of which fat is removed is added 50 parts by mass of p-cresol, the mixture is stirred at room temperature for 4 hours to the mixture is added 50 parts by mass of 78% concentrated sulfuric acid, and the mixture is stirred at 30° C. for 1 hour. After that, 1000 parts by mass of distilled water is added and stirred, and then upper layer is separated and removed with the use of decantation. The lower layer is dissolved in the diethyl ether, acetone is added thereto, and diethyl ether layer is extracted by using a separatory funnel. To this diethyl ether layer is added distilled water and re-deposited, thereby obtaining the lignophenol derivative.

Figure 2:
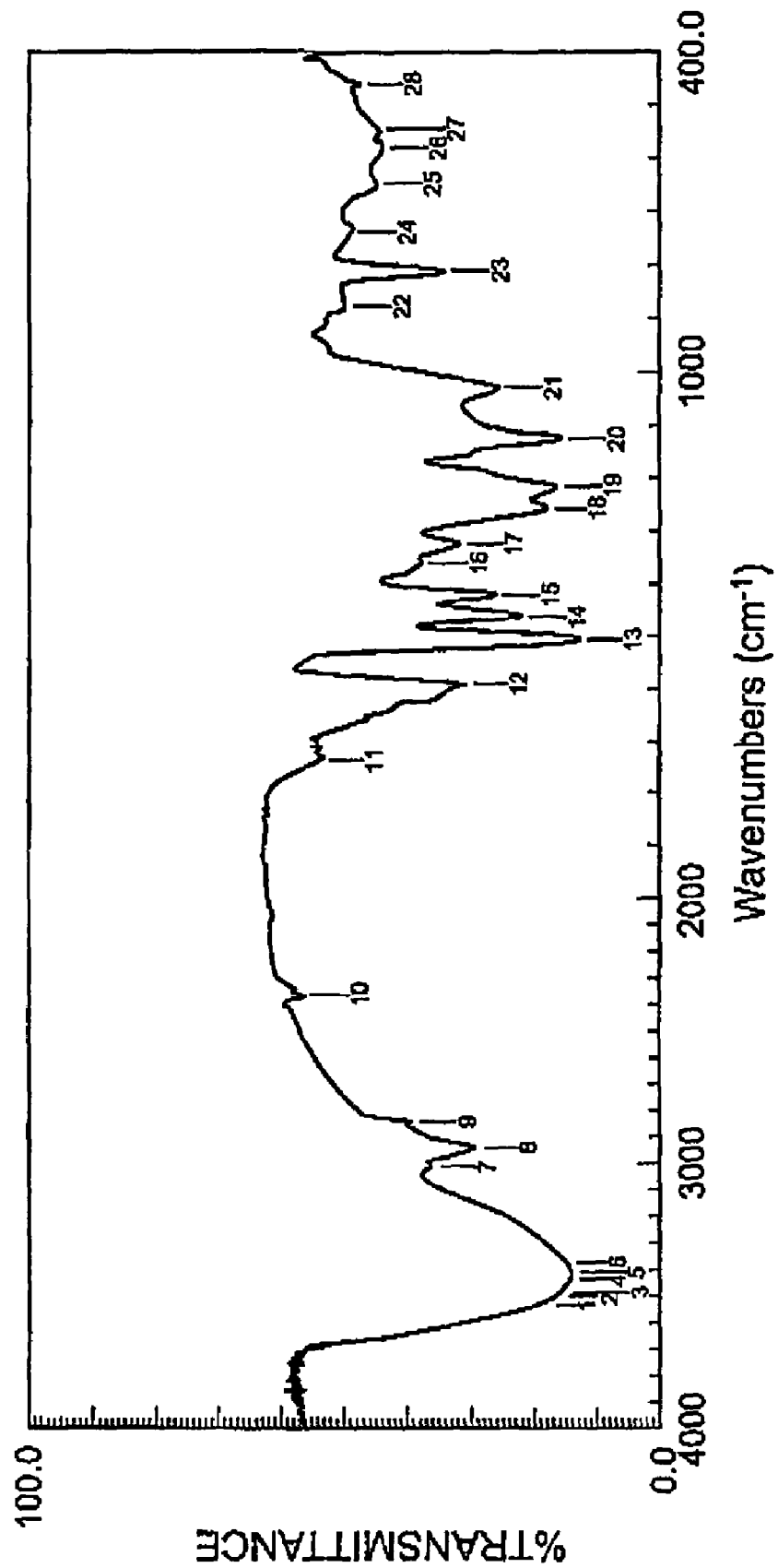
FIG. 2 shows an inferred absorption spectrum of a lignophenol derivative A obtained by Example 1.

Next, 10 parts by mass of lignophenol derivative thus obtained is dissolved in 10 parts by mass of methylethyl ketone and heated to 200° C., and to) the resultant is added 5 parts by mass of methanol and 0.001 part by mass of tetrabutoxy titan and then the stirred for 1 hour. As described above, a polymer mixture of the lignophenol derivative represented by Formula (2) (wherein, n is 40 (average value of the polymer mixture) and the weight-averaged molecular weight is 18000 (in terms of polystyrene), hereinafter, referred to as 'lignophenol derivative A') is obtained. An infrared absorption spectrum of the lignophenol derivative A thus obtained is shown in FIG. 2. Measurement of the weight-averaged molecular weight and introduction of n are performed as described above.

(Preparation of Resin Composition and Production of Molded Resin)

Next, the resin composition thus obtained is introduced in an injection molding machine (NEX 150, manufactured by Nissei Plastic Industrial Co., Ltd.) and molded at a cylinder temperature of 180° C. and mold temperature of 40° C. so as to mold UL94-V test piece (thickness of 1.6 mm) and ISO multifunctional dumbbell test piece (ISO 527). By using UL 94-V test piece (thickness of 1.6 mm), UL94-V combustion test is carried out. In addition, the ISO multifunctional dumbbell test piece is processed to measure charpy impact resistance by using the impact resistance measuring device (manufactured by TOYO SEIKI Co., Ltd., DG-C) and load-deflection temperature (ISO 75) of high load (1.85 MPa) by using HDT measuring device (manufactured by Toyo Seiki Seisaku-Sho, Ltd., HDT measuring device standard model). The results thus obtained are shown in Table 1.

(UL94-V Combustion Test)

The flame resistance (UL standard) is a safety standard to electrical equipments, which is established and permitted by UNDERWRITERS LABORATORIES INC. of USA, and is a standard provided by a vertical combustion test based on a UL combustion test method. According to flame retardant properties, the flame resistance is classified into V-0, V-1 and V-2, and a material is more flame retardant as the material is closer to V-0. In a combustion time of 10 seconds or less to 30 seconds or less, V-0 to V-1 levels are cases where a molten material is not dropped while burning, and V-2 level is a case where a molten material is dropped while burning.

<Test Method>

To contact a flame of a gas burner to a lower end of a test piece held vertically for 10 seconds. To contact again the flame to the lower of the test piece when the combustion is stopped within 30 seconds. To repeat the above test five times by changes test pieces.

<Criteria>

V-0: (i) There are no test pieces which burn for 10 seconds or more after a predetermined time of flame contact. (ii) Total combustion time of 10 times of flame contacts does not exceed 50 seconds with respect to five test pieces. (iii) There are no test pieces which turn up to a location of a fixing clamp. (iv) There are no test pieces which drop burning particles for firing an absorbent cotton placed below the test piece. (v) There are no test pieces which glow continuously for 30 seconds or more after a second time of flame contact.

V-1: (i) There are no test pieces which burn for 30 seconds or more after a predetermined time of flame contact. (ii) Total combustion time does not exceed 250 seconds with respect to five test pieces. (iii) There are no test pieces which burn up to a location of a fixing clamp. (iv) There are no test pieces which drop burning particles for firing an absorbent cotton placed below the test piece. (v) There are no test pieces which glow continuously for go seconds or more after a second time of flame contact.

V-2: (i) There are no test pieces which burn for 30 seconds or more after a predetermined time of flame contact. (ii) Total combustion time of 10 times of flame contacts does not exceed 250 seconds with respect to five test pieces. (iii) There are no test pieces which burn up to a location of a fixing clamp. (iv) Burning particles fox firing an absorbent cotton placed below the test piece is permitted to be dropped. (v) There are no test pieces which glow continuously for 60 seconds or more after a second time of flame contact.

Example 2

(Synthesis of Lignophenol Derivative B)

The synthesis of lignophenol derivative is carried out in the same manner as that in Example 1 except that the amount of tetrabutoxy titan is changed from 0.001 part by mass to 0.005 parts by mass and the stirring time is changed from 1 hour to 2 hours. As described above, a polymer mixture of the lignophenol derivative represented by Formula (2) (wherein, n is 9000 (average value of the polymer mixture) and the weight-averaged molecular weight is 3800000 (in terms of polystyrene), hereinafter, referred to as 'lignophenol derivative B') is obtained.

(Preparation of Resin Composition and Production of Molded Resin)

The resin composition is prepared in the same manner as that in Example 1 except that the lignophenol derivative B is used instead of the lignophenol derivative A. The UL94-V test piece and ISO multifunctional test piece are molded to perform UL94-V combustion test, charpy impact resistance test, and measurement of the load-deflection temperature. The results thus obtained are shown in Table 1. In table 1, 'NB' in a category of the charpy impact resistance test indicates that the test piece is not broken (Not Break).

Example 3

(Synthesis of Lignophenol Derivative C)

The synthesis of lignophenol derivative is carried out in the same manner as that in Example a except that the amount of methanol is caged from 5 pas by mass to 7 tarts by mass, the amount of tetrabutoxy titan is changed from 0.001 part by mass to 0.0005 parts by mass, and the stirring time is changed from 1 hour to 0.5 hour. As described above, a polymer mixture of the lignophenol derivative represented by Formula (3) (wherein, n is 70 (average value of the polymer mixture) and the weight-averaged molecular weight is 31000 (in terms of polystyrene), hereinafter, referred to as 'lignophenol derivative C') is obtained.

(Preparation of Resin Composition and Production of Molded Resin)

The resin composition is prepared in the same manner as that in Example 1 except that the lignophenol derivative C is used instead of the lignophenol derivative A. The UL94-V test piece and ISO multifunctional test piece are molded to perform UL94-V combustion test, charpy impact resistance test, and measurement of the load-deflection temperature. The results thus obtained are shown in Table 1.

Example 4

(Synthesis of Lignophenol Derivative D)

The synthesis of lignophenol derivative is carried out in the same maser as that in Example 1 except that the amount of methanol is changed from 5 parts by mass to 10 parts by mass and the amount of tetrabutoxy titan is changed from 0.001 part by mass to 0.0005 parts by mass. As described above, a polymer mixture of the lignophenol derivative represented by Formula (4) (wherein, n is 85 (average value of the polymer mixture) and the weight-averaged molecular weight is 42000 (in terms of polystyrene), hereinafter, referred to as 'lignophenol derivative D') is obtained.

(Preparation of Resin composition and Production of Molded Resin)

The resin composition is prepared in the same manner as that in Example 1 except that the lignophenol derivative D is used instead of the lignophenol derivative A. The UL94-V test piece and ISO multifunctional test piece are molded to perform UL94-V combustion test, charpy impact resistance test, and measurement of the load-deflection temperature. The results thus obtained are shown in Table 1.

A compound of 50 parts by mass of the lignophenol derivative A and 50 parts by mass of polylactic acid (LACEA H-100, manufactured by Mitsui Chemicals, Inc., weight-averaged molecular weight: 90000 (in terms of polystyrene)) is kneaded at a cylinder temperature of 190° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 6

A compound of 20 parts by mass of the lignophenol derivative A and 80 parts by mass of polylactic acid (LACEA H-100, manufactured by Mitsui chemicals, Inc., weight-averaged molecular weight; 90000 (in terms of polystyrene)) is kneaded at a cylinder temperature of 190° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 7

A compound of 10 parts by mass of the lignophenol derivative A and 90 parts by mass of polylactic acid (LACEA H-100, manufactured by Mitsui Chemicals, Inc., weight-averaged molecular weight: 90000 (in terms of polystyrene)) is kneaded at a cylinder temperature of 190° C. by using a biaxial kneading machine (manufactured by Toyo Saiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 8

A compound of 10 parts by mass of the lignophenol derivative A and 90 parts by mass of polylactic acid (TERRAMAC TE4000, manufactured by UNITIKA. LTD., weight-averaged molecular weight: 45000 (in terms of polystyrene)) is kneaded at a cylinder temperature of 190° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 9

A compound of 10 parts by mass of the lignophenol derivative A, 45 parts by mass of polylactic acid (TERRAMAC TE4000, manufactured by UNITIKA. LTD., weight-averaged molecular weight: 45000 (in terms of polystyrene)), and 45 parts by mass of polycarbonate (Panlite L1225Y, manufactured by TEIJIN CHEMICALS LTD., weight-averaged molecular weight: 22000) is kneaded at a cylinder temperature of 220° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, a measurement of the load-deflection temperature. The results thus obtained are shown in Table 1.

Example 10

A compound of 20 parts by mass of the lignophenol derivative A, 40 parts by mass of polylactic acid (TERRAMAC TE4000, manufactured by UNITIKA. LTD., weight-averaged molecular weight: 45000 (in terms of polystyrene)), and 40 parts by mass of polycarbonate (Panlite L1225Y, manufactured by TEIJIN CHEMICALS LTD., weight-averaged molecular weight: 22000) is kneaded at a cylinder temperature of 220° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 11

A compound of 20 parts by mass of the lignophenol derivative A, 60 parts by mass of polylactic acid (TERRAMAC TE4000, manufactured by UNITIKA. LTD., weight-averaged molecular weight: 45000 (in terms of polystyrene)), and 20 parts by mass of polycarbonate (Panlite L1225Y, manufactured by TEIJIN CHEMICALS LTD., weight-averaged molecular weight: 22000) is kneaded at a cylinder temperature of 220° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 12

A compound of 10 parts by mass of the lignophenol derivative B and 90 parts by mass of polylactic acid (LACEA H-100, manufactured by Mitsui Chemicals, Inc., weight-averaged molecular weight: 90000 (in terms of polystyrene)) is kneaded at a cylinder temperature of 160° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Example 13

A compound of 10 parts by mass of the lignophenol derivative C and 90 parts by mass of polylactic acid (LACEA H-100, manufactured by Mitsui Chemicals, Inc. weight-averaged molecular weight: 90000 (in terms of polystyrene)) is kneaded at a cylinder temperature of 180° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the Same manner as that in Example 1 except that the resin composition thus obtained is used such to perform UL94-V combustion test, charpy impact resistance test, and measurement of the load-deflection temperature. The results thus obtained are shown in Table 1.

Example 14

A compound of 10 parts by mass of the lignophenol derivative D and 90 parts by mass of polylactic acid (LACEA H-100, manufactured by Mitsui Chemicals, Inc., weight-averaged molecular weight: 90000 (in terms of polystyrene)) is kneaded at a cylinder temperature of 180° C. by using a biaxial kneading machine (manufactured by Toyo Seiki Seisaku-Sho Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Comparative Example 1

A compound of 80 parts by mass of polylactic acid (LACEA H-100, manufactured by Mitsui Chemicals, Inc., weight-averaged molecular weight; 90000 (in terms of polystyrene)) and 20 parts by mass of a condensed phosphoric acid ester-based flame retardant (PX-200, manufactured by DAIHACHI CHEMICAL INDUSTRY CO., LTD.) is kneaded at a cylinder temperature of 180° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Comparative Example 2

A compound of 80 parts by mass of polylactic acid (LA-CEA H-100, manufactured by Mitsui Chemicals, Inc., weight-averaged molecular weight; 90000 (in terms of polystyrene)) and 20 parts by mass of a condensed phosphoric acid ester-based flame retardant (TPP, manufactured by DAIHACHI CHEMICAL INDUSTRY CO., LTD.) is kneaded at a cylinder temperature of 175° C. by using a biaxial kneading machine (manufactured by Toyo Seiki Seisaku-Sho, Ltd., labo plastomill L/D25 types so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Comparative Example 3

A compound of 80 parts by mass of polylactic acid (TERRAMAC TE4000, manufactured by UNITIKA.LTD., weight-averaged molecular weight: 45000 (in terms of polystyrene)) and 20 parts by mass of a condensed phosphoric acid ester-based flame retardant (PX-200, manufactured by DAIHACHI CHEMICAL INDUSTRY CO., LTD.) is kneaded at a cylinder temperature of 175° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Comparative Example 4

A compound of 40 parts by mass of polylactic acid (LA-CEA H-100, manufactured by Mitsui Chemicals, Inc., weight-averaged molecular weight-90000 (in terms of polystyrene)), 40 parts by mass of polycarbonate (Panlite L1225Y, manufactured by TEIJIN CHEMICALS LTD., weight-averaged molecular weight: 22000), and 20 parts by mass of a condensed phosphoric acid ester-based flame retardant (TPP, manufactured by DAIHACHI CHEMICAL INDUSTRY CO., LTD.) is kneaded at a cylinder temperature of 220° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Comparative Example 5

A compound of 45 parts by mass of polylactic acid (LA-CEA H-100, manufactured by Mitsui Chemicals, Inc., weight-averaged molecular weight: 90000 (in terms of polystyrene)), 45 parts by mass of polycarbonate (Panlite L1225Y, manufactured by TEIJIN CHEMICALS LTD., weight-averaged molecular weight: 22000), and 10 parts by mass of a condensed phosphoric acid ester-based flame retardant (TPP, manufactured by DAIHACHI CHEMICAL INDUSTRY CO., LTD.) is kneaded at a cylinder temperature of 220° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1. In Table 1, "Not" in the column for UL94-V test means that the result did not achieve V-2 (the same will apply to the followings).

Comparative Example 6

A compound of 44 parts by mass of polylactic acid (LA-CEA H-100, manufactured by Mitsui Chemicals, Inc., weight-averaged molecular weight: 90000 (in terms of polystyrene)), 44 parts by mass of polycarbonate (Panlite L1225Y, manufactured by TEIJIN CHEMICALS LTD., weight-averaged molecular weight: 22000), 10 parts by mass of a condensed phosphoric acid ester-based flame retardant (TPP, manufactured by DAIHACHI CHEMICAL INDUSTRY CO., LTD.), and 2 parts by mass of a silicon-based flame retardant (DC4, manufactured by Dow Corning Toray Co., Ltd.) is kneaded at a cylinder temperature of 220° C. by using a biaxial kneading machine (manufactured by Toyo Seiki Seisaku-Sho, Ltd., labo plastomill L/D25 type) so that the resin composition is obtained. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

Comparative Example 7

(Synthesis of Lignophenol Derivative X)

Small fragments generated at the time of lumbering *Chamaecyparis obtusa* are screened by using a screen having 20 mesh, 10 parts by mass of the chips thus screened are immersed in acetone for 20 hours and then vacuum dried at 80° C. for 8 hours, and the fat is removed. To the chips of which fat is removed is added 50 parts by mass of p-cresol, the mixture is stirred at room temperature for 4 hours, to the mixture is added 50 parts by mass of 78% concentrated sulfuric acid, and the mixture is stirred at 30° C. for 1 hour. After that, 1000 parts by mass of distilled water is added and stirred, and then upper layer is separated and removed with the use of decantation. The lower layer is dissolved in the diethylether, acetone is added thereto, and diethylether layer is extracted by using a separatory funnel. To this diethylether layer is added distilled water and re-deposited, thereby obtaining the lignophenol derivative (hereinafter, referred to as 'lignophenol derivative X'). The lignophenol derivative X has a repeating unit as represented below.

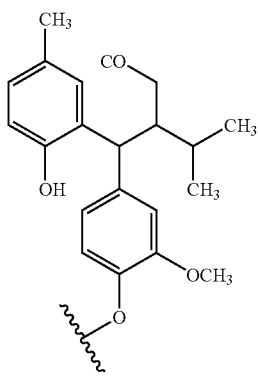

(Preparation of Resin Composition and Production of Molded Resin)

30 parts by mass of the lignophenol derivative X and 6 parts by mass of maleic acid anhydride which have been sufficiently pulverized by at mortar are mixed in a beaker and then mixed with 1000 parts by mass of polylactic acid which have been sufficiently dried at 80° C. in a plastic bag and the mixture is introduced in a single screw extruder (manufactured by TOYO SEIKI Co., Ltd., labo plastomill) and then kneaded for several times at a molding temperature of 190° C. and a screw rotation speed of 40 ppm, thereby obtaining a pellet. 103 parts by weight of thus obtained pellet is mixed with 897 parts by mass of polylactic acid, the mixture is introduced in the single screw extruder (manufactured by TOYO SEIKI Co., Ltd., labo plastomill) and kneaded at a molding temperature of 190° C. and a screw rotation speed of 40 ppm, thereby obtaining a resin composition containing the lignophenol derivative X in the amount of 1 weight %. The UL94-V test piece and ISO multifunctional test piece are molded in the same manner as that in Example 1 except that the resin composition thus obtained is used such to perform UL94-V combustion test, charpy impact resistance test, and measurement of the load-deflection temperature. The results thus obtained are shown in Table 1.

TABLE 1

| | Degree of Plant Contents (wt %) | UL94-V | Charpy Impact Resistance Strength (kJ/m$^2$) | Load-deflection temperature (° C.) |
|---|---|---|---|---|
| Example 1 | 100 | V-0 | 49 | 178 |
| Example 2 | 100 | V-0 | NB | 183 |
| Example 3 | 100 | V-0 | 48 | 175 |
| Example 4 | 100 | V-0 | 49 | 173 |
| Example 5 | 100 | V-0 | 28 | 105 |
| Example 6 | 100 | V-0 | 14 | 95 |
| Example 7 | 100 | V-1 | 8.5 | 82 |
| Example 8 | 100 | V-1 | 8.8 | 85 |
| Example 9 | 100 | V-0 | 25 | 155 |
| Example 10 | 100 | V-0 | 28 | 156 |
| Example 11 | 100 | V-0 | 22 | 148 |
| Example 12 | 100 | V-1 | 6.5 | 80 |
| Example 13 | 100 | V-1 | 6.4 | 81 |
| Example 14 | 100 | V-1 | 6.8 | 85 |
| Comparative Example 1 | 80 | V-2 | 0.7 | 56 |
| Comparative Example 2 | 80 | V-2 | 0.8 | 54 |
| Comparative Example 3 | 80 | V-2 | 0.8 | 56 |
| Comparative Example 4 | 40 | V-2 | 2.0 | 72 |
| Comparative Example 5 | 45 | Not | 2.5 | 70 |
| Comparative Example 6 | 44 | Not | 3.8 | 75 |
| Comparative Example 7 | 99.9 | Not | 0.8 | 56 |

What is claimed is:

1. A lignophenol derivative represented by Formula (1):

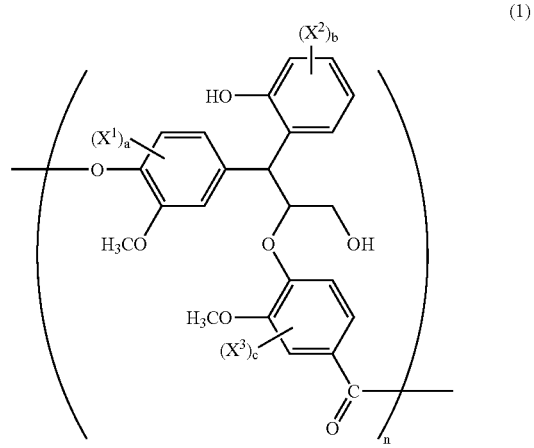

(1)

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group;

a and c each independently is an integer of 0 to 3;

b is an integer of 0 to 4; and n is an integer of 1 to 10000.

2. The lignophenol derivative according to claim 1, which is represented by any one of Formulas (2) to (4):

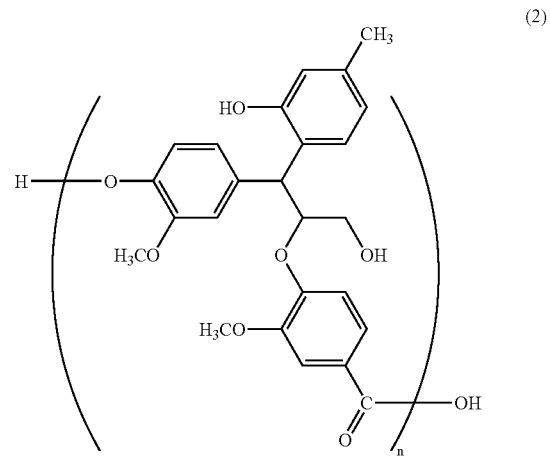

(2)

wherein n is an integer of 1 to 10000, (3)

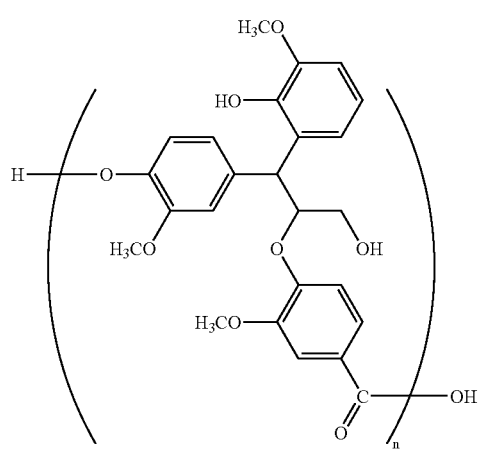

wherein n is an integer of 1 to 10000, and (4)

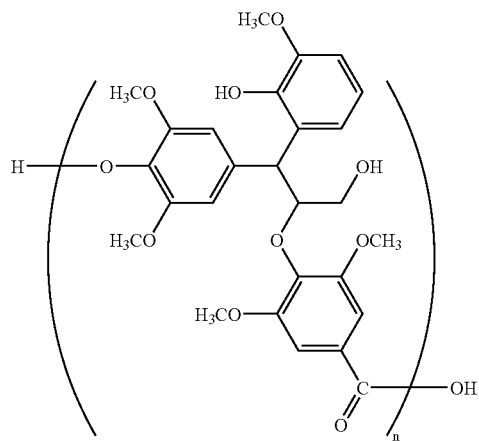

wherein n is an integer of 1 to 10000.

3. The lignophenol derivative according to claim 1, which has a weight-averaged molecular weight in the range of 5000 to 500000 in terms of polystyrene.

4. A polymer comprising a structural unit represented by Formula (5):

(5)

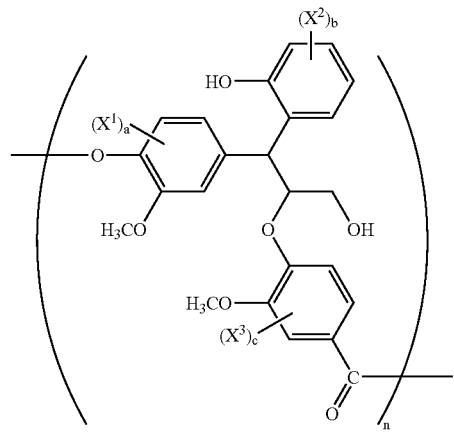

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group;

a and c each independently is an integer of 0 to 3;

b is an integer of 0 to 4; and n is an integer of 1 to 10000.

5. A resin composition comprising at least one of a lignophenol derivative and a polymer, wherein the lignophenol derivative is represented by Formula (1):

(1)

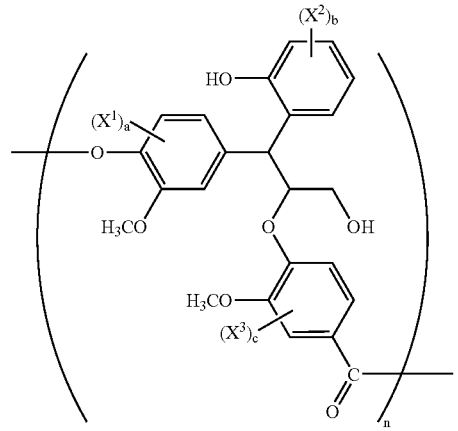

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group;

a and c each independently is an integer of 0 to 3;

b is an integer of 0 to 4;and n is an integer of 1 to 10000, and the polymer comprises a structural unit represented by Formula (5):

(5)

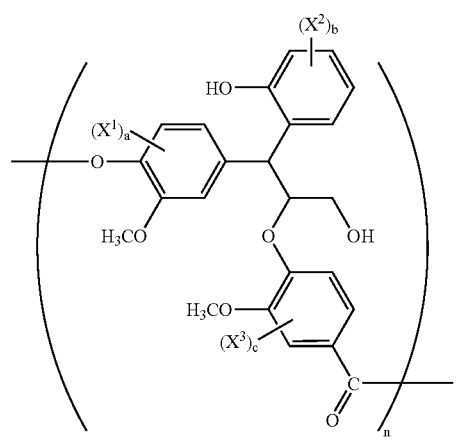

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group;

a and c each independently is an integer of 0 to 3;

b is an integer of 0 to 4; and n is an integer of 1 to 10000.

6. The resin composition according to claim 5, further comprising aliphatic polyester.

7. The resin composition according to claim 5,
wherein a total content of the lignophenol derivative and the polymer is in the range of 5 mass % to 100 mass %, based on a total content of the resin composition.

8. A molded resin comprising at least one of a lignophenol derivative and a polymer,
wherein the lignophenol derivative is represented by Formula (1):

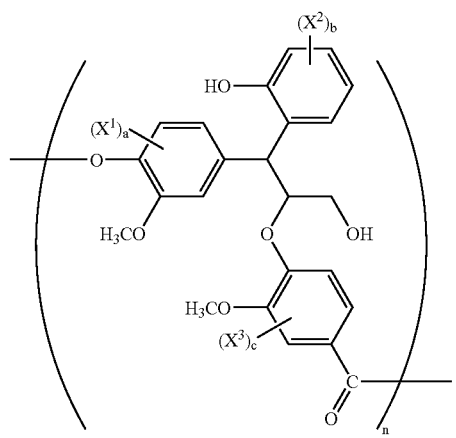

(1)

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group;

a and c each independently is an integer of 0 to 3;

b is an integer of 0 to 4; and n is an integer of 1 to 10000, and the polymer comprises a structural unit represented by Formula (5):

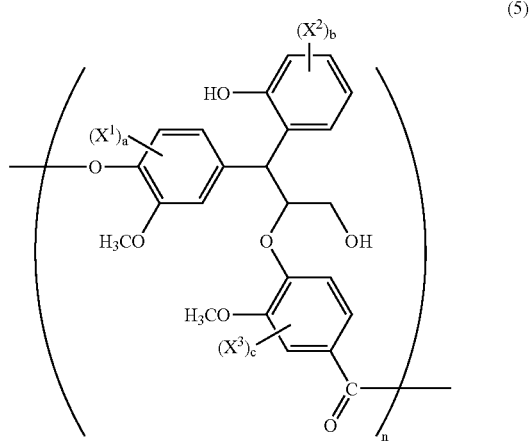

(5)

wherein $X^1$, $X^2$ and $X^3$ each independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group;

a and c each independently is an integer of 0 to 3;

b is an integer of 0 to 4;and n is an integer of 1 to 10000.

9. The molded resin according to claim 8, further comprising aliphatic polyester.

10. The molded resin according to claim 8, wherein a total content of the lignophenol derivative and the polymer is in the range of 5 mass % to 100 mass %, based on a total content of the molded resin.

* * * * *